(12) United States Patent
Wu

(10) Patent No.: US 6,224,005 B1
(45) Date of Patent: May 1, 2001

(54) INNER GRINDING MEMBER OF A PEPPER GRINDER

(75) Inventor: Hua-Te Wu, Tainan (TW)

(73) Assignee: Yienn Lih Enterprise Co., Ltd., Tainan (TW)

( * ) Notice: Subject to any disclaimer, the term of this patent is extended or adjusted under 35 U.S.C. 154(b) by 0 days.

(21) Appl. No.: 09/455,763

(22) Filed: Dec. 7, 1999

(51) Int. Cl.⁷ .................................................. A47J 42/10
(52) U.S. Cl. ............................................................ 241/169.1
(58) Field of Search .................................. 241/169.1, 168, 241/285.1, 293

(56) References Cited

U.S. PATENT DOCUMENTS 3,168,256 * 2/1965 Bounds et al. ..................... 241/169.1
5,785,264 * 7/1998 Yang ................................. 241/169.1

* cited by examiner

*Primary Examiner*—Mark Rosenbaum
(74) *Attorney, Agent, or Firm*—Rosenberg, Klein & Lee

(57) ABSTRACT

An inner grinding member of a pepper grinder comprises a main body and a cushion member. The inner grinding member is received in, and can turn relative to an outer grinding member for grinding pepper into small particulate therebetween. The inner grinding member can be made of porcelain, and has a holding room on a bottom side. The cushion member is made of plastic, and comprises a polygonal lower part, and an upper part. The holding room is shaped such that the cushion member can be received therein with no space in between. A bolt is passed through the main body and the cushion member, and connects a nut arranged under the cushion member. The bolt is further connected to a transmission member. The cushion member can prevent the inner porcelain grinding member from being broken by the nut when the bolt is screwed into the nut too hard.

1 Claim, 3 Drawing Sheets

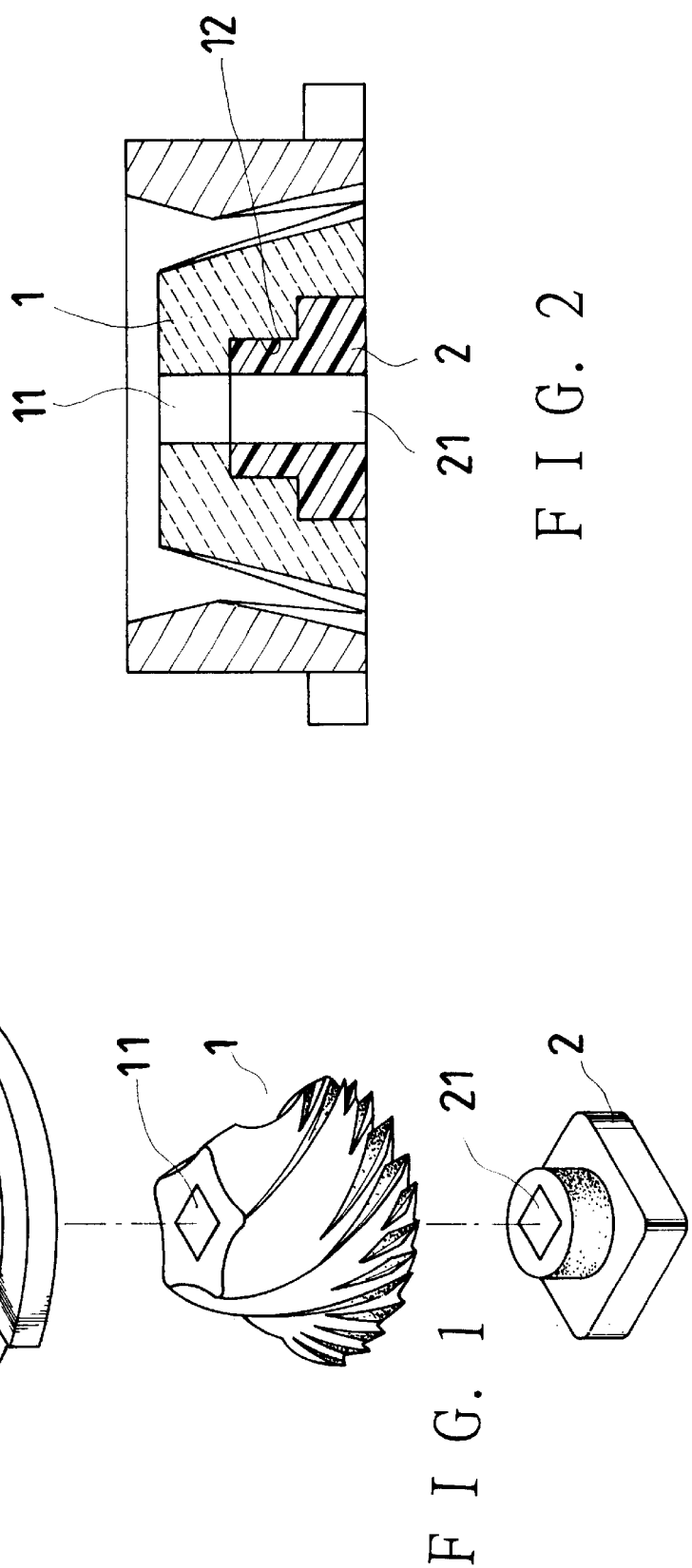

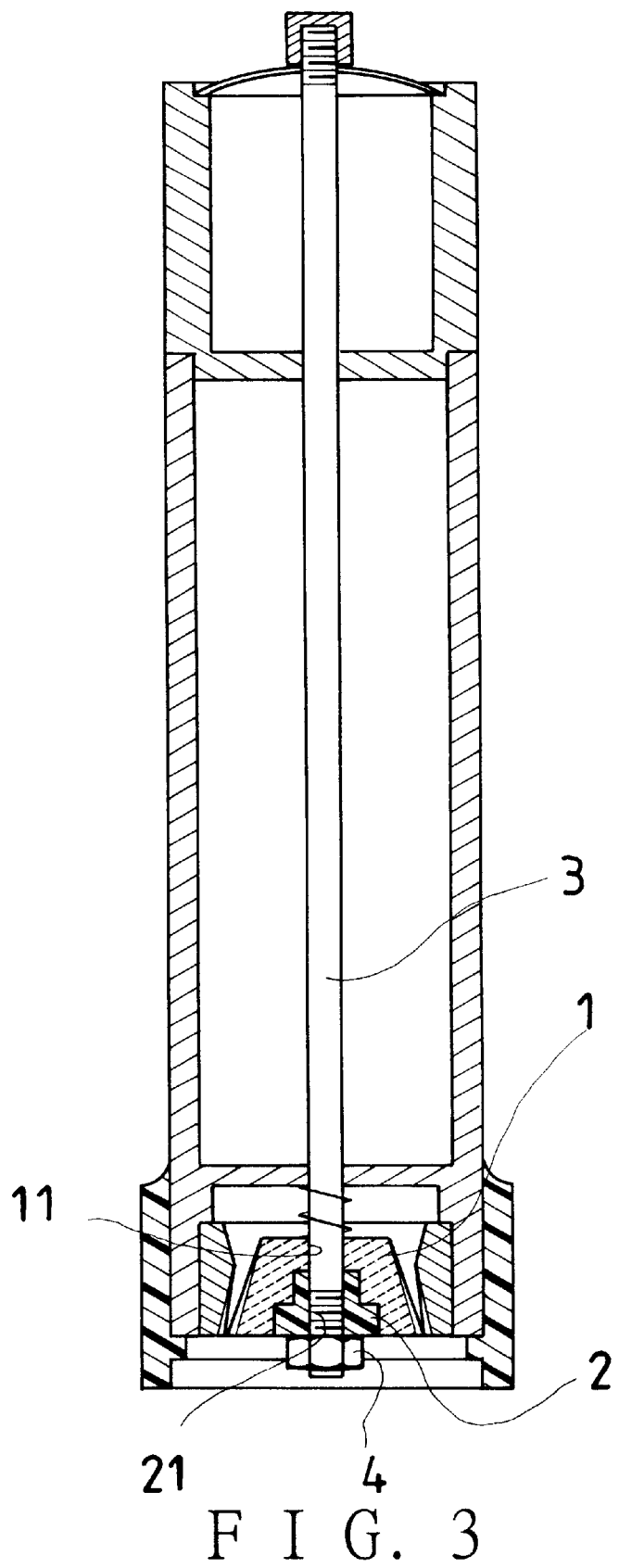
F I G. 3

INNER GRINDING MEMBER OF A PEPPER GRINDER

BACKGROUND OF THE INVENTION

The present invention relates to a pepper grinder, and particularly to an inner grinding member of the pepper grinder.

Referring to FIGS. 4 and 5, a heretofore known pepper grinder has an inner grinding member 10 and an outer grinding member 20. The outer grinding member 20 is housed in a housing and the inner grinding member 10 is connected to a transmission member (not shown) such that the inner grinding member 10 can turn relative to the outer grinding member 20 to grind pepper into finer particulates between the inner and the outer grinding members 10 and 20.

The grinding members 10 and 20 are made of metallic materials. Therefore, metal chipping and shaving can be easily formed when the inner grinding member 10 turns relative to, and rubs against the outer grinding member 20. The metal chipping and shaving are then mixed with the pepper particulate, and will endanger the health of the people eating the pepper particulate.

To overcome the above undesirable feature, grinding members made of pottery and porcelain are provided. The grinding members made of pottery and porcelain are relatively hard, and cannot rust. So, they can overcome the disadvantages of the above said ones.

However, because the inner grinding member is made of pottery and porcelain, it is likely to be broken by a metal bolt, which connects it to the transmission member when the metal bolt is screwed onto it too hard.

SUMMARY OF THE INVENTION

Therefore, it is a main object of the present invention to provide an inner grinding member which won't be easily broken by the metal bolt connecting the inner grinding member with the transmission member.

The inner grinding member comprises a main body and a cushion member. The main body has teeth thereon, and is received in an outer grinding member of the pepper grinding such that the inner grinding member can turn relative to the outer member to grind pepper into small particulates therebetween.

The inner grinding member is made of porcelain, and has a holding room on a bottom side. The cushion member is made of plastic, and has a polygonal lower part and an upper part. The cushion member is received in the holding room of the main body; the holding room is shaped such that the cushion member can be firmly received therein with no space in between.

A bolt is passed through the inner grinding member, and connects to a nut arranged under the cushion member. The bolt is further connected to a transmission member. Thus, the cushion member can prevent the inner grinding member from being broken by the nut when the bolt is screwed into the nut too hard.

BRIEF DESCRIPTION OF THE DRAWINGS

The present invention will be better understood by reference to the accompanying drawings, wherein:

FIG. 1 is an exploded perspective view of the grinding members of a pepper grinder of the present invention.

FIG. 2 is a cross-sectional view of the grinding members of a pepper grinder of the present invention.

FIG. 3 is a cross-sectional view of the pepper grinder according to the present invention.

DESCRIPTION OF THE PREFERRED EMBODIMENTS

Figure 5:
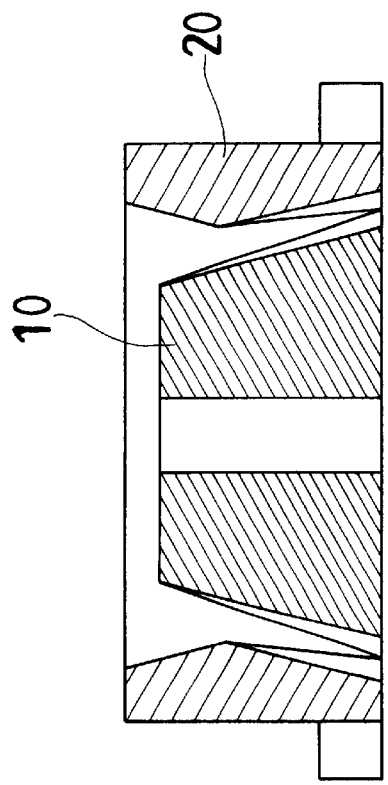
FIG. 5 is a cross-sectional view of the prior art grinding members in FIG. 4.
Figure 4:
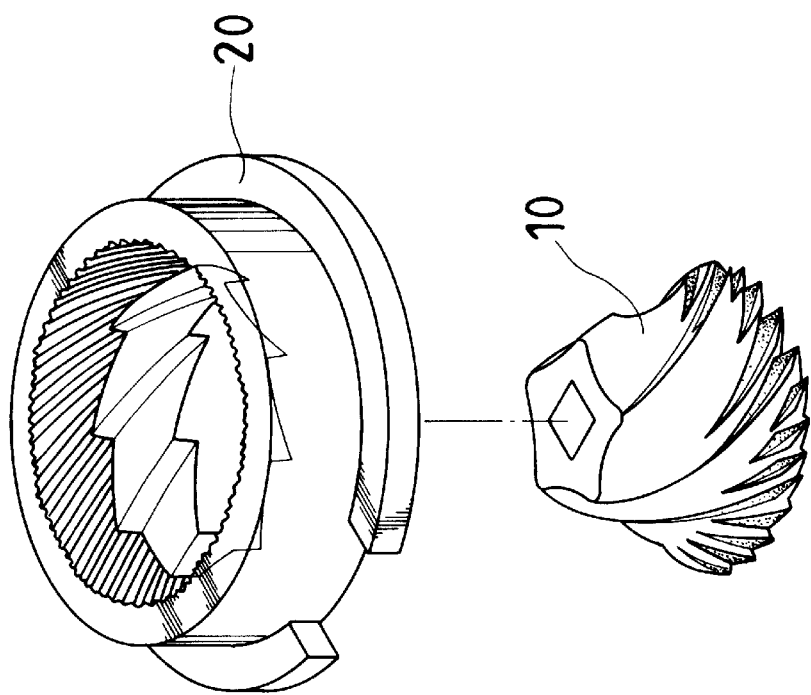
FIG. 4 is an exploded perspective view of the prior art grinding members as described in the Background.

Referring to FIGS. 1 and 2, an inner grinding member of the present invention comprises a main body 1 and a cushion member 2. The main body 1 is made of pottery and porcelain, and has teeth (not shown) thereon. The main body 1 has a through hole 11 and a holding room 12 on a bottom side. The holding room 12 is shaped such that the cushion member 2 can be fitted thereinto with no space therebetween.

The cushion member 2 is made of plastic, and has a through hole 21, and is shaped to have a polygonal block lower part and an upper part. In the embodiment of the present invention, the polygonal block lower part is a square block. And, the upper part is a cylinder block.

In combination, the cushion member 2 is firmly fitted to the holding room 12 of the main body 1. Referring to FIG. 3, a metal bolt 3 is passed through the through holes 11 and 21, and connected to a nut 4 arranged under said cushion member 2 in order to connect a transmission member (not shown) with the inner grinding member.

Because of the cushion member 2, the nut 4 cannot touch the pottery main body 1, preventing the main body 1 from being broken when the bolt 3 is screwed onto the bolt 4 too hard.

What is claimed is:

1. An inner grinding member of a pepper grinder, comprising:

a main body having teeth thereon, said main body being able to turn within an outer grinding member of said pepper grinder to grind pepper into small particulate between both said grinding members, said main body having a holding room on a bottom side thereof, a plastic cushion member received in said holding room, said cushion member having a polygonal block lower part and a cylinder upper part; said holding room being shaped such that said cushion member can be received therein with no space in between; a bolt being passed through said main body and said cushion member, and screwed onto a nut arranged under said cushion member for connecting said inner grinding member to a transmission member.

* * * * *